July 1, 1958 A. W. BLOW 2,841,647

PRIVACY INSURING MEANS FOR INTERCOMMUNICATION SYSTEMS

Filed Dec. 7, 1953

INVENTOR.
ANGUS W. BLOW
BY Philip S. Schmidt
AGENT 2,841,647

PRIVACY INSURING MEANS FOR INTERCOMMUNICATION SYSTEMS

Angus W. Blow, Rochester, N. Y., assignor, by mesne assignments, to General Dynamics Corporation, a corporation of Delaware Application December 7, 1953, Serial No. 396,530

9 Claims. (Cl. 179—1)

My invention relates to intercommunication systems, and more particularly to an arrangement for insuring the privacy of users of such systems.

Intercommunication systems are known which comprise a master station and one or more remote stations. In general, communication may be initiated by the master station with any of the remote stations, but not vice versa. The master station usually includes amplifying means and a switch for controlling the direction of transmission, but the remote stations may each include only a bilateral transducer, that is, a transducer capable both of converting electrical energy into sound energy and of converting sound energy into electrical energy. A line extends from each remote station to the master station, and where there is a plurality of remote stations, the master is provided with means for selecting the particular remote station with which it is desired to establish communication.

The disadvantage of systems of this sort is that the user of the master station may eavesdrop on proceedings of the remote station users when no intercommunication is under way. Even though the user of the master station would not stoop to such practices, the user of the remote station frequently suspects that he might, and therefore may harbor ill feelings.

A number of arrangements have been proposed to obviate this source of ill feeling by eliminating the possibility of eavesdropping by the user of the master station, and thereby insuring the privacy of the user of the remote station. Such solutions to the problem as have been put forward before my invention have proved complicated and expensive, because many of them require relays at the master station, or else require an extra wire between stations, and so have proved difficult to add to existing systems in which wiring is concealed in a building. Eavesdropping may be prevented by short-circuiting the transducer at the remote station, of course, but this prevents voice call-in from the master station to the remote station.

It is accordingly an object of my invention to provide in an intercommunication system, a new and useful means for insuring privacy without interference to the voice call-in function.

It is also an object of my invention to provide an arrangement for insuring the privacy of remote station users in an intercommunication system which is simple, inexpensive, and easily installed.

In general, I accomplish these and other objects of my invention by inserting a non-linear impedance means in the line connecting a remote station to the master station.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which.

I have chosen to illustrate my invention as applied to a system consisting of a master station and a single remote station. Those skilled in the art can readily understand that the principles embodied in a simple system of this type may be readily extended to multi-station systems, including those having a plurality of remote stations. In the latter case, it is merely necessary to duplicate the arrangement shown in the exampled embodiments for each remote station.

Figure 1:
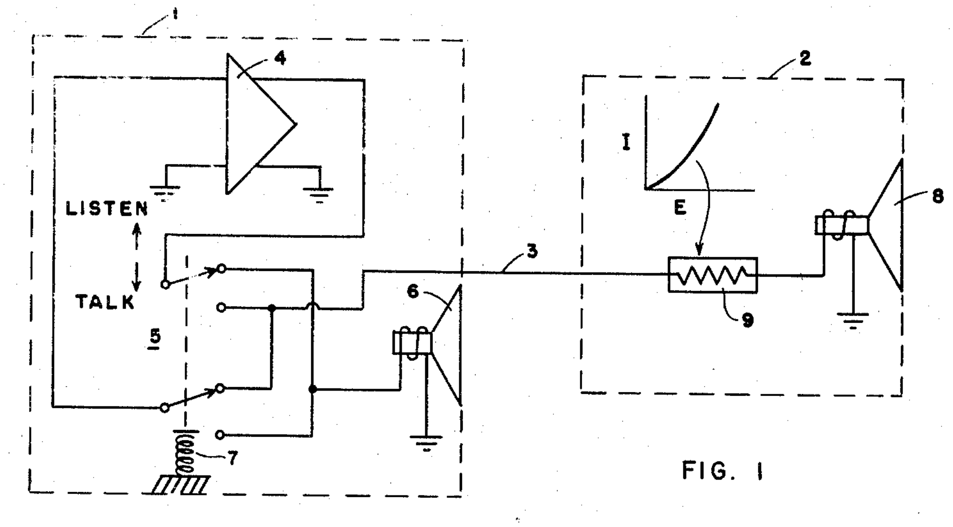
Fig. 1 is a schematic wiring diagram of one embodiment of my invention.

Referring now to Fig. 1, there is shown a master station 1 and a remote station 2, with a line 3 extending between them. The master station may be conventional throughout, and may include an amplifier 4, a talk-listen switch 5, and a transducer 6. When the talk-listen switch 5 is in the "talk" position (downward in the schematic wiring diagram) transducer 6 is connected to the input of amplifier 4, while the output of amplifier 4 is connected to line 3. Talk-listen switch 5 may be arranged to be biased into the "listen" position as shown, as by means of spring 7. When so biased, transducer 6 is connected to the output of amplifier 4, while line 3 is connected to its input.

Remote station 2 conventionally includes a bilateral transducer 8. Thus transducer 8 may be used to convert electrical energy from line 3 into sound energy or sound energy striking loudspeaker 6 into electrical energy, and thus feeding it to line 3. In accordance with my invention, however, there is inserted, between line 3 and transducer 8, non-linear impedance means which I have indicated generally by reference numeral 9.

Non-linear impedance means 9 is preferably substantially resistive in character. It may be a varistor, an assembly of back-to-back rectifiers made of selenium, germanium, copper oxide, magnesium sulphate, thyrite, for example, or other temperature sensitive devices with suitable time constants. Any device of this nature exhibits a non-linear impedance characteristic. I have indicated in figurative fashion that the current I versus voltage E characteristic of this material is to be a curved rather than a straight line, and therefore non-linear. In accordance with my invention, the non-linear impedance means has a current versus voltage characteristic whose slope increases as the applied voltage increases, as is indicated generally in the drawing.

Any material exhibiting a suitable non-linear impedance characteristic for voice frequencies may be used, provided its response is rapid enough to accommodate the highest audio frequencies to be transmitted. Since intercommunication systems are generally designed for use with speech only, the upper limit of frequency response need be only 3,000 cycles per second, and therefore a material capable of responding at this frequency is suitable for use in my invention.

The embodiment of Fig. 1 operates as follows: When transducer 8 is used as a loudspeaker, the voltage applied to non-linear resistance 9 is sufficiently high to reduce its internal impedance to a low value, as compared to the transducer impedance. Transducer 8 therefore operates efficiently as a loudspeaker. When transducer 8 is used as a microphone, however, the voltage applied across impedance 9 is small. Its impedance consequently remains high, as compared to the amplifier input Z and the efficiency of transducer 8 as a microphone is thereby rendered very poor. With suitable materials for impedance means 9 which are readily available on a commercial basis, about 50 db of attenuation can be obtained when transducer 8 is used as a microphone. This amount of attenuation is sufficient to prevent ordinary eavesdropping, but permits transducer 8 to be used as a microphone if the speaking level is high enough to overcome the 50 db attenuation. If it is desired to eliminate the necessity for close or loud talking, non-linear impedance means 9 may be short-circuited, as by a push-button or shorting switch not shown, when using the intercommunication system for intercommunication purposes.

With the embodiment of Fig. 1, the impedances and voltages used should be chosen, using techniques familiar to those skilled in the art, for a suitable compromise between loudspeaker efficiency and microphone efficiency on the part of transducer 8. Problems may therefore be encountered when a plurality of remote stations is used and the impedances of the various remote station transducers are not the same.

Figure 2:
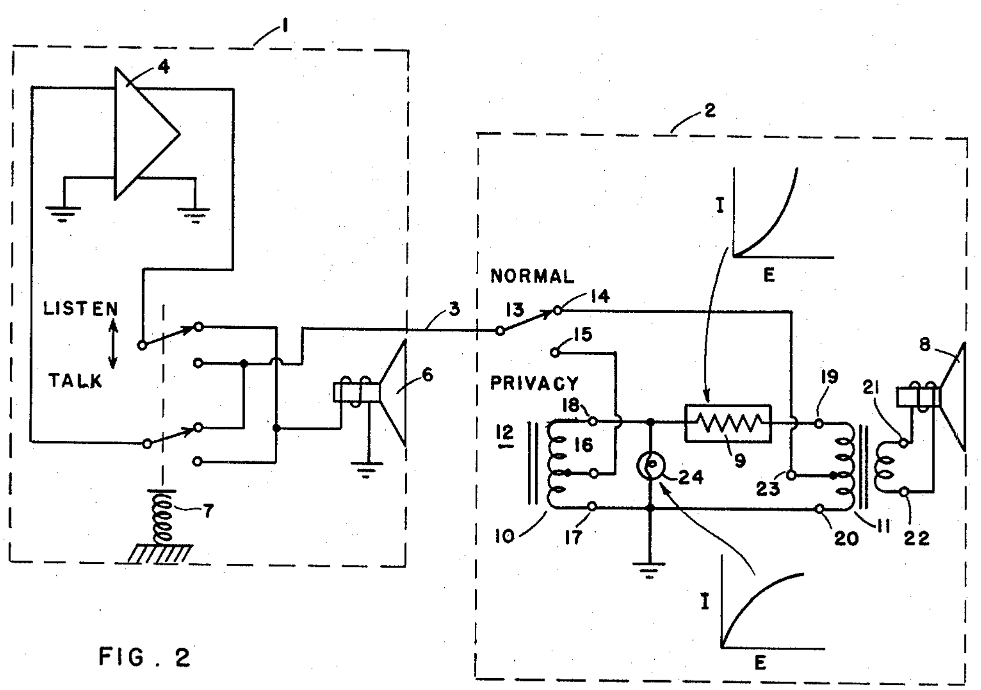
Fig. 2 is a schematic wiring diagram of a second embodiment of my invention.

To obviate these difficulties, I have shown the arrangement of Fig. 2, which allows my invention to be used with any speaker or line impedance. The elements of master station 1 in Fig. 2 may be the same as those of Fig. 1. Remote station 2 as in the case of Fig. 1, may include a transducer 8 and a non-linear impedance means 9. In addition, however, there is provided a first impedance transforming means 10 and a second impedance transforming means 11.

There is also provided in the embodiment of Fig. 2 a normal-privacy switch 12 having a contact arm 13 and switch points 14 and 15. When arm 13 is in contact with contact point 14, communication may take place as in the conventional type of master-remote communication system. When switch arm 13 is in contact with contact point 15, the privacy afforded by my invention is obtained.

Impedance transforming means 10 comprises an autotransformer having input terminals 16, 17 and output terminals 18, 17. The impedance seen looking into input terminals 16, 17 is preferably equal to or greater than the line impedance. Impedance transforming means 11 has input terminals 19, 20 and output terminals 21, 22. Output terminals 21, 22 are connected to transducer 8; the impedance seen looking into these terminals is preferably higher than the impedance of transducer 8. Impedance transforming means 11 is also provided with auxiliary input terminals 23, 20.

Line 3 may be connected via switch arm 13 and switch point 15 of normal-privacy switch 12 to input terminals 16, 17 of impedance transforming means 10. Output terminals 18, 17 of impedance transforming means 10 are connected to input terminals 19, 20 of impedance transforming means 11 through non-linear impedance means 9. The impedance looking into terminals 18, 17 preferably equals that looking into terminals 19, 20. In accordance with my invention, I prefer that these impedances be higher than either the impedance of transducer 8 or the impedance seen looking into terminals 16, 17. Means 10 is therefore preferably an impedance step-up means, while means 11 is preferably an impedance step-down means. Non-linear impedance means 9 may have the characteristics and be made of the materials set forth above.

I may prefer to add a second non-linear impedance means 24 to the foregoing arrangement. Non-linear impedance means 24 preferably has a current versus voltage characteristic whose slope decreases with increasing voltage, whereas, as mentioned above, non-linear impedance means 9 has a current versus voltage characteristic whose slope increases with increasing voltage. A negative current versus voltage characteristic is exhibited, for example, by a tungsten lamp. Since non-linear impedance means 24 has a characteristic which may be, in effect, the reciprocal of the characteristic of non-linear impedance means 9, and since it is connected in shunt instead of in series with output terminals 18, 17 of impedance transforming means 10, its action aids that of non-linear impedance means 9 according to the well-known laws of reciprocity.

Since the efficiency of transducer 8 as both microphone and loudspeaker may not be optimum in the arrangement of Fig. 2, I prefer to provide contact point 14 in normal-privacy switch 12. This contact point is connected to auxiliary input terminal 23 of impedance transforming means 11. I prefer to connect auxiliary input terminal 23 to impedance transforming means 11 such that an impedance match between line 3 and transducer 8 is obtained. Thus, when switch arm 13 is placed on contact point 14, the impedance of line 3 may be correctly matched to the impedance of transducer 8, and the efficiency of transducer 8 thereby optimized. I prefer that normal-privacy switch 12 be placed in a location convenient to the user of remote station 2, so that he can alternatively and optionally insure his privacy by placing arm 13 on contact point 15, yet may obtain optimum communication efficiency by placing switch arm 13 on contact point 14.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a communication system of the type including a first station, a second station, and a line interconnecting said stations, and in which said second station has a bilateral sound transducer, the improvement which consists of providing a substantially resistive non-linear impedance means in series with said line, and said transducer, the maximum impedance of said non-linear means being large relative to the impedance of said line and providing a maximum impedance to small amplitude signals generated by said transducer and a minimum impedance to large amplitude signals applied to said line at said first station whereby privacy is assured at said second station.

2. In a communication system, the combination of a first station, a second station, a bilateral sound transducer at said second station, a line extending from said first station to said second station, first input-transforming means having input and output terminals, said input terminals of said first impedance-transforming means being connected to said line; second impedance-transforming means having input and output terminals, the output terminals of said second impedance-transforming means being connected to said transducer; non-linear impedance means; and said output terminals of said first impedance-transforming means being connected to said input terminals of said second impedance transforming means through said non-linear impedance means, the maximum impedance of said last named means being large relative to the impedance of said line and providing a maximum impedance to small amplitude signals generated by said transducer and a minimum impedance to large amplitude signals applied to said line at said first station whereby privacy is assured at said second station.

3. The combination of claim 2 in which said non-linear impedance means is substantially resistive in character.

4. The combination of claim 2 to which is added second non-linear impedance means, the output terminals of said first impedance transforming means being shunted by said second non-linear impedance means.

5. In a communication system, the combination of a first station, a second station, a bilateral sound transducer at said second station, a line extending between said stations, impedance step-up means at said second station operable to step up the impedance level of said line, non-linear impedance means at said second station, impedance step-down means connected to said impedance step-up means through said non-linear impedance means, said transducer being connected to said impedance step-down means and switch means capable of connecting said line to said impedance step-up means to thereby insert said impedance means in circuit with said line and said transducer and provide a maximum impedance to small amplitude signals generated by said transducer and a minimum impedance to large amplitude signals applied to said line at said first station, said switch means being capable of alternatively and optionally connecting said line to said transducer through said impedance step-down means on an impedance matching basis and thereby render said non-linear impedance means ineffective.

6. In a communication system, the combination of a first station, a second station, a line extending from said first station to said second station, a bilateral sound transducer at said second station, first and second impedance transforming means, each having input and output terminals; said output terminal of said second impedance transforming means being connected to said transducer; non-linear impedance means; said output terminals of said first impedance transforming means being connected to said input terminals of said second impedance transforming means through said non-linear impedance means, said second impedance transforming means having an auxiliary input terminal, the impedance of said second impedance transforming means presented at said auxiliary input terminals being lower than the impedance of said input terminals of said second impedance transforming device; and switch means capable of connecting said line to said input terminals of said first impedance transforming means when in a first condition to thereby insert said impedance means in circuit with said line and said transducer and provide a maximum impedance to small amplitude signals generated by said transducer and a minimum impedance to large amplitude signals applied to said line at said first station, said switch means being capable of alternatively and optionally connecting said line to said auxiliary terminal of said second impedance transforming means when in a second condition to thereby render said non-linear impedance means ineffective for assuring privacy at said second station.

7. The combination of claim 6 in which said non-linear impedance is substantially resistive in character.

8. The combination of claim 6 to which is added second non-linear impedance means, the input terminals of said first impedance transforming means being shunted by said second non-linear impedance means.

9. The combination of claim 8 in which said second non-linear impedance means has a negative voltage-current characteristic.

References Cited in the file of this patent

UNITED STATES PATENTS

| | | |
|---|---|---|
| 1,937,641 | Crisson | Dec. 5, 1933 |
| 2,021,920 | Norwine | Nov. 26, 1935 |
| 2,182,329 | Wheele | Dec. 5, 1939 |
| 2,200,461 | Varley | May 14, 1940 |
| 2,200,462 | Varley | May 14, 1940 |
| 2,360,932 | Bullington | Oct. 24, 1944 |
| 2,360,940 | Edwards | Oct. 24, 1944 |
| 2,361,160 | Abraham | Oct. 24, 1944 |
| 2,522,402 | Robertson | Sept. 12, 1950 |
| 2,582,498 | Merril | Jan. 14, 1952 |
| 2,632,812 | Cooney | Mar. 14, 1953 |